United States Patent
Aibara et al.

(10) Patent No.: US 8,761,118 B2
(45) Date of Patent: Jun. 24, 2014

(54) WIRELESS COMMUNICATION SYSTEM AND WIRELESS COMMUNICATION METHOD TO PERFORM HANDOVER OF COMMUNICATION USING DIFFERENT COMMUNICATION SYSTEMS

(75) Inventors: Takehiro Aibara, Hamura (JP); Kimiyasu Mizuno, Akishima (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 715 days.

(21) Appl. No.: 12/752,184

(22) Filed: Apr. 1, 2010

(65) Prior Publication Data
US 2010/0254349 A1 Oct. 7, 2010

(30) Foreign Application Priority Data
Apr. 3, 2009 (JP) .................................. 2009-091051

(51) Int. Cl.
*H04W 36/00* (2009.01)

(52) U.S. Cl.
USPC ......................................................... 370/331

(58) Field of Classification Search
USPC ......... 370/331, 437, 334, 338, 254; 455/41.1, 455/41.2, 67.11
See application file for complete search history.

(56) References Cited

U.S. PATENT DOCUMENTS

| 2004/0127214 A1* | 7/2004 | Reddy et al. ............... 455/426.2 |
| 2005/0265295 A1 | 12/2005 | Ishizuka |
| 2006/0062190 A1 | 3/2006 | Suga |
| 2006/0239236 A1 | 10/2006 | Otsuka |
| 2008/0261525 A1 | 10/2008 | Matsuo et al. |
| 2009/0034498 A1 | 2/2009 | Banerjea et al. |

FOREIGN PATENT DOCUMENTS

| JP | 2003-110579 A | 4/2003 |
| JP | 2004-112225 A | 4/2004 |
| JP | 2004-364145 | 12/2004 |
| JP | 2005-341232 A | 12/2005 |
| JP | 2006-086936 A | 3/2006 |
| JP | 2006-261852 A | 9/2006 |
| JP | 2006-303924 A | 11/2006 |

(Continued)

OTHER PUBLICATIONS

Japanese Office Action dated Nov. 15, 2011 (and English translation thereof) in counterpart Japanese Application No. 2009-091051.

(Continued)

*Primary Examiner* — Thai Nguyen
(74) *Attorney, Agent, or Firm* — Holtz Holtz Goodman & Chick PC

(57) ABSTRACT

Disclosed is that when the first wireless communication apparatus is connected to a terminal apparatus such as a wireless access point wirelessly, the second wireless communication apparatus performs the communication with the first wireless communication apparatus by a short distance wireless communication, then the first wireless communication apparatus transmits participation information to participate in the network to the second wireless communication apparatus by the short distance wireless communication, and the second wireless communication apparatus is connected to the network based on the received participation information so as to communicate with the first wireless communication apparatus through the terminal apparatus.

6 Claims, 7 Drawing Sheets

(56) References Cited

FOREIGN PATENT DOCUMENTS

| | | |
|---|---|---|
| JP | 2007-074598 | 3/2007 |
| JP | 2007-097022 | 4/2007 |
| JP | 2008-098880 | 4/2008 |
| JP | 2008-271151 | 11/2008 |
| WO | WO 2009/018361 A1 | 2/2009 |

OTHER PUBLICATIONS

Japanese Office Action dated Mar. 22, 2011 (and English translation thereof) in counterpart Japanese Application No. 2009-091051.

* cited by examiner

WIRELESS COMMUNICATION SYSTEM AND WIRELESS COMMUNICATION METHOD TO PERFORM HANDOVER OF COMMUNICATION USING DIFFERENT COMMUNICATION SYSTEMS

CROSS-REFERENCE TO RELATED APPLICATIONS

This application is based upon and claims the benefit of priority under 35 USC 119 of Japanese Patent Application No. 2009-091051 filed on Apr. 3, 2009, the entire disclosure of which, including the description, claims, drawings, and abstract, is incorporated herein by reference.

BACKGROUND OF THE INVENTION

1. Field of the Invention

The present invention relates to a wireless communication system and a wireless communication method to perform a handover of a communication using different communication systems.

2. Description of the Related Art

In recent years, in a case where a wireless communication is performed between a wireless communication apparatus to transmit data (which is an initiator) and a wireless communication apparatus to receive the transmitted data (which is a target), different communication methods may be used according to the communication distance. As such, techniques are disclosed in which data are transmitted and received by switching a communication method to another according to the communication distance. To be more specific, a technique has been paid attention to in which a short distance wireless communication such as NFC (Near Field Communication) is used to perform an authentication, and then the communication is handed over from the short distance wireless communication to a wireless communication of another communication method.

For example, Japanese Patent Application Laid-open Publication No. 2007-74598 discloses the following communication system. That is, a video camera performs a communication with a remote commander by the NFC, to obtain protocol information (a media code for Bluetooth (registered trademark)) and communication information (BT address) applicable to a television receiver from the remote commander by the communication of NFC. Thereby, a communication is performed with the television receiver by a communication protocol indicated by the applicable protocol information based on the communication information.

Further, Japanese Patent Application Laid-open Publication No. 2007-97022 discloses the following communication system. That is, a HD (Hard Disk) recorder obtains a communication function list of a TV (television) by an NFC communication from the TV through a repeater. Then, the HD recorder transmits a request of content data to the TV by a communication means other than the NFC communication based on the communication function list. After the HD recorder has been authenticated, the TV transmits the content data by the same communication means as the one by which the content data is requested.

However, for example, in a PC (personal computer) and a digital camera which are capable of performing a wireless communication through both of NFC and a wireless LAN (local area network), when the PC (personal computer) which is connected to an internet through the wireless LAN is to be connected to the digital camera through the wireless LAN by using a handover by NFC so as to transmit image data, it can be conceived that the PC is disconnected with the internet and is to be connected to the digital camera.

In such as case, it is possible for the PC user that even when the user is not willing to disconnect the connection to the internet, the PC happens to be disconnected with the internet so that the communication with the digital camera is to be performed. As described above, in a handover operation using different wireless communication methods such as NFC and the wireless LAN, and in a case where a wireless section to be connected to a network of a target side apparatus (for example, PC) using the wireless LAN, and the like, is being in use, a user tends to be put in a position where the usability is degraded. Further, when the wireless section to be connected to the network of the target side using the wireless LAN, and the like, is in use, the operation of the wireless section is not defined.

In order to solve the above described problems, the object of the present invention includes improving the operation performance of wireless communication methods to perform the handover using different communication methods.

SUMMARY OF THE INVENTION

In view of the above described problems, the object of the present invention further includes providing a wireless communication equipment to perform the handover of a communication from one communication method to another.

According to an aspect of the present invention, provided is a wireless communication system comprising a terminal apparatus, a first wireless communication apparatus and a second wireless communication apparatus which exist in a network, wherein the first wireless communication apparatus comprises:

a first wireless section to perform a wireless communication with the terminal apparatus or the second wireless communication apparatus;

a second wireless section to perform a short distance wireless communication with the second wireless communication apparatus; and a first control section to instruct the second wireless section to transmit participation information to the second wireless communication apparatus so as to participate in the network, in a case where a communication with the second wireless communication apparatus is handed over from the short distance wireless communication performed by the second wireless section to the wireless communication performed by the first wireless section, and in the case where the first wireless section is connected to the terminal apparatus so that the first wireless communication apparatus participates in the network, and wherein the second wireless communication apparatus comprises:

a third wireless section to perform the wireless communication with the terminal apparatus or the first wireless communication apparatus;

a fourth wireless section to perform the short distance wireless communication with the first wireless communication apparatus; and a second control section to instruct the third wireless section to be connected to the network so that the second wireless communication apparatus participates in the network based on the participation information, in a case where the communication with the first wireless communication apparatus is handed over from the short distance wireless communication performed by the fourth wireless section to the wireless communication performed by the third wireless section, and in the case where the participation information is obtained by the fourth wireless section.

According to another aspect of the present invention, provided is a wireless communication method of a wireless communication system comprising a terminal apparatus, a first wireless communication apparatus and a second wireless communication apparatus which exist in a network, wherein a communication of the first wireless communication apparatus and the second wireless communication apparatus is handed over from a short distance wireless communication to another wireless communication, and wherein the wireless communication method comprises:

transmitting participation information to the second wireless communication apparatus through the short distance wireless communication so as to participate in the network, in a case where the first wireless communication apparatus is connected to the terminal apparatus through the wireless communication so that the first wireless communication apparatus participates in the network; and participating of the second wireless communication apparatus in the network by being connected to the network through the wireless communication based on the participation information, in the case where the second wireless communication apparatus receives the participation information through the short distance wireless communication.

According to the present invention, a wireless communication equipment to perform the handover of a communication using different communication method can be provided, thereby the wireless connection between the wireless communication equipments can be performed smoothly.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention, wherein.

DETAILED DESCRIPTION OF THE PREFERRED EMBODIMENTS

Hereinbelow, preferred embodiments of the present invention are described with reference to the attached drawings. Incidentally, the present invention is not limited to the embodiments. Further, although the following embodiments are illustrated as what is technically preferable in performing the present invention, the scope of the invention is not limited to the technical terms used therein.

First, configurations are explained.

Figure 1:
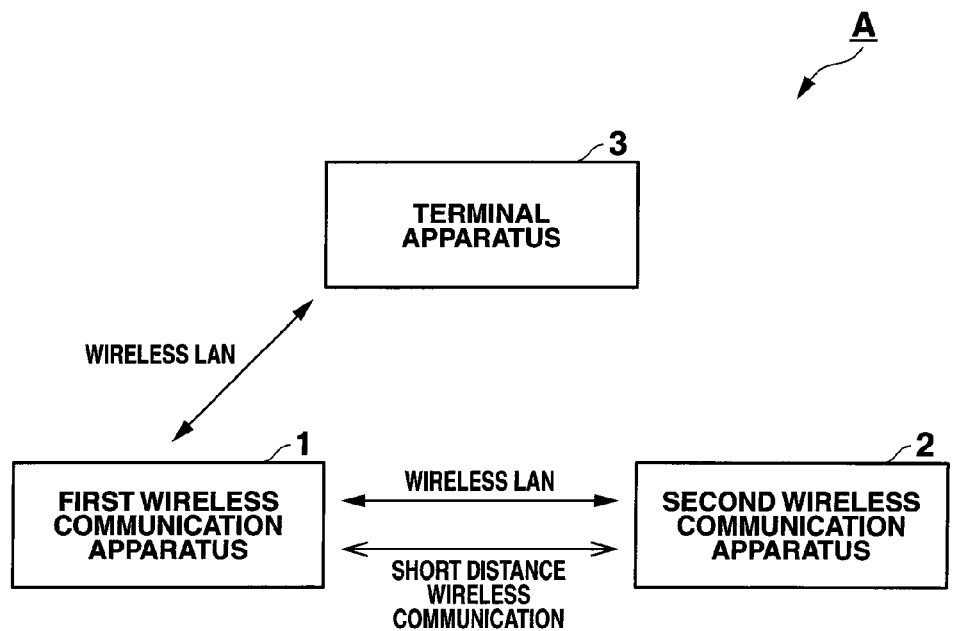
FIG. 1 is a schematic configuration diagram of a wireless communication system according to an embodiment of the present invention.

FIG. 1 shows a schematic configuration diagram of a wireless communication system A according to the present embodiment.

As shown in FIG. 1, the wireless communication system A comprises a first wireless communication apparatus 1, a second wireless communication apparatus 2 and a terminal apparatus 3. Incidentally, the first wireless communication apparatus 1 and the second wireless communication apparatus 2 may share the same apparatus configuration. The first wireless communication apparatus 1 and the second wireless communication apparatus 2 according to the present embodiment have the function to perform the wireless communication with each other through a short distance wireless communication by the NFC (Near Field Communication) and/or a wireless LAN (Local Area Network) by IEEE802.11b. Further, in the present embodiment, the terminal apparatus 3 functions as a wireless access point in the network, and is connected to the first wireless communication apparatus 1 or the second wireless communication apparatus 2 through the wireless LAN.

NFC is a communication protocol for a proximity communication by an electromagnetic induction using a single radio frequency. The radio frequency used in the NFC may for example be 13.56 MHz, and the like. In the NFC, the apparatus to transmit data is referred to as an initiator, and the apparatus to receive the transmitted data is referred to as a target. In the present embodiment, the first wireless communication apparatus 1 is the target, and the second wireless communication apparatus 2 is the initiator.

Figure 2:
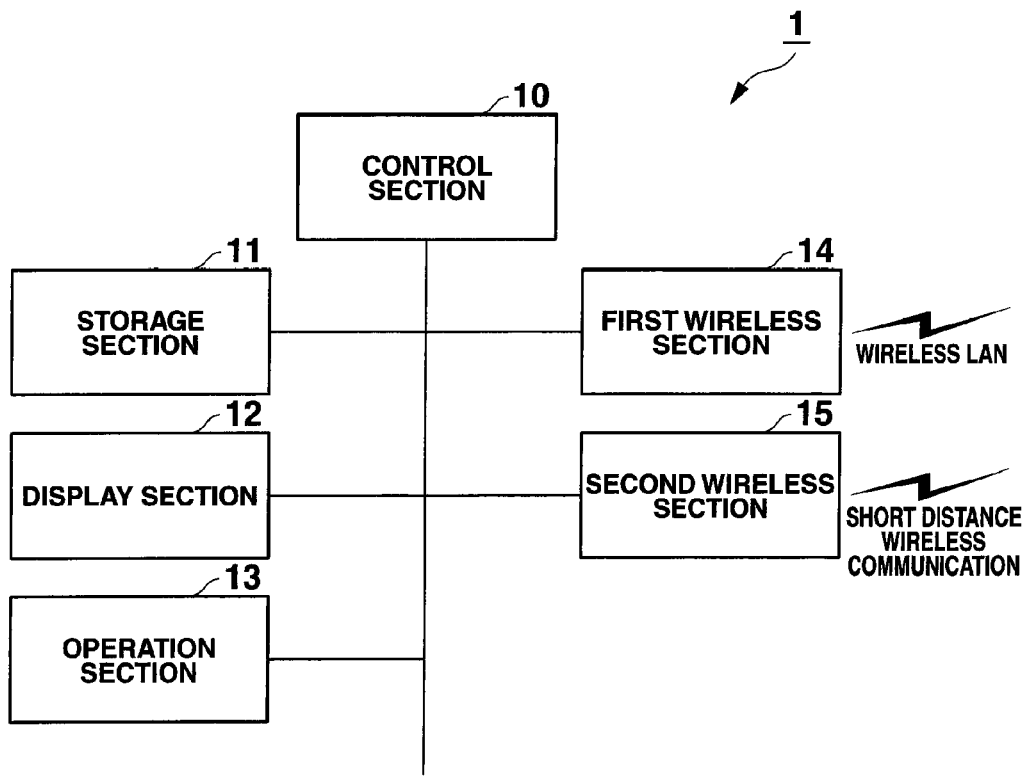
FIG. 2 is a schematic configuration diagram of a first wireless communication apparatus.

FIG. 2 shows a schematic configuration diagram of the first wireless communication apparatus 1.

As shown in FIG. 2, the first wireless communication apparatus 1 comprises a control section 10, a storage section 11, a display section 12, an operation section 13, a first wireless section 14, a second wireless section 15, and the like, and each section is connected to each other electrically.

The control section 10 comprises a CPU (central processing unit), a ROM (read only memory), a RAM (random access memory), and the like. The CPU (computer) in the control section 10 reads out a program, a table or data specified from various programs, various tables, data, and the like stored in the storage section 11; expands the read out program, table, or data in a work area in the RAM or the storage section 11; executes various processing in cooperation with the above described programs; and stores the obtained processing results in a predetermined region in the RAM or the storage section 11. The CPU further gives instructions to each section in the first wireless communication apparatus 1 to integrally control general operations in the first wireless communication apparatus 1.

Further, the control section 10 reads out a handover processing program stored in the storage section 11, various necessary data, and the like from the ROM or the storage section 11, to perform handover processing. The handover processing is processing in which the first wireless communication apparatus 1 performs the short distance wireless communication with the second wireless communication apparatus 2 through NFC by the second wireless section 15, and then hands over the communication with the second wireless communication apparatus 2 to a wireless communication through the wireless LAN by the first wireless section 14.

When this handover processing is being performed, in a case where the first wireless section 14 is connected to the terminal apparatus 3 through the wireless LAN so that the first wireless communication apparatus 1 participates in the network in which the terminal apparatus 3 exists, the control section 10 according to the present embodiment instructs the second wireless section 15 to transmit participation information to the second wireless communication apparatus 2 through the NFC in order to participate in the network.

Then, the control section 10 performs the wireless communication with the second wireless communication apparatus 2 through the network in which the first wireless communication apparatus 1 and the terminal apparatus 3 exist.

The storage section 11 comprises a magnetic or optic recording medium, or a recording medium made of a semiconductor, and the like. The storage section 11 may be fixed to the first wireless communication apparatus 1, or may be removably attached thereto. Further, various programs to be executed by the control section 10, and various tables, data, and the like to be used in the programs are stored in the storage section 11 in advance, and the recording mediums can be read by the CPU (computer).

The display section 12 comprises a LCD (liquid crystal display), and EL (electroluminescence) display, and the like, and displays various information according to signals input from the control section 10.

The operation section 13 comprises keypads including various input keypads such as a numerical keypad, a character input keypad, and the like; a pointing device to receive an input of position information; and the like. The operation section 13 outputs key input information input from the keypads, and the position information input from the pointing device to the control section 10 as operation information.

The first wireless section 14 performs the wireless communication with the second wireless communication apparatus or the terminal apparatus through the wireless LAN by IEEE802.11.

Figure 3:
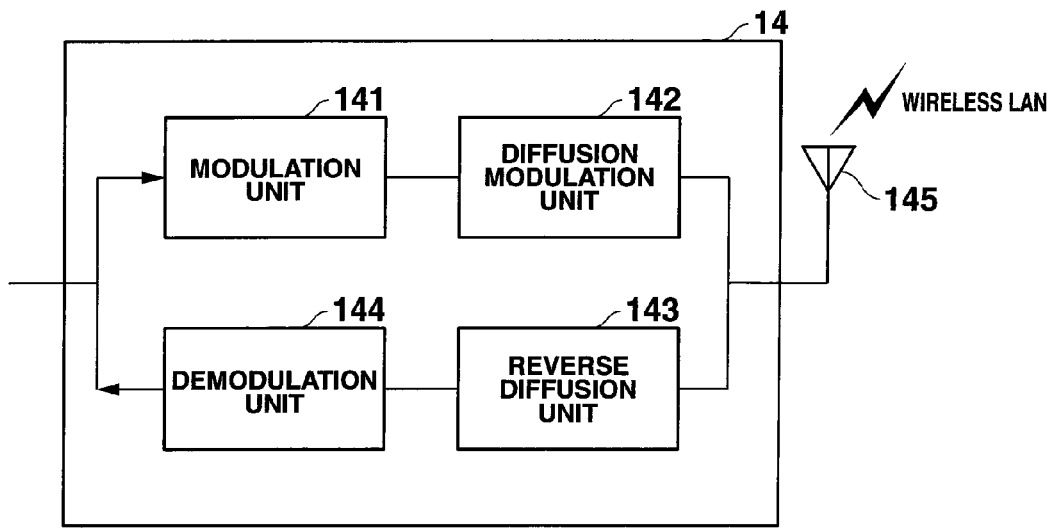
FIG. 3 is a diagram illustrating an internal configuration of a first wireless section.

FIG. 3 shows an internal configuration of the first wireless section 14.

The first wireless section 14 shown in FIG. 3 comprises a modulation unit 141, a diffusion modulation unit 142, a reverse diffusion unit 143, a demodulation unit 144, and an antenna 145.

The modulation unit 141 is a circuit having a modulation system corresponding to the IEEE802.11 standard to modulate the phase of data to be transmitted. The diffusion modulation unit 142 modulates the frequency of the data to be transmitted by a diffusion system (such as DSSS (direct sequence-spread spectrum), OFDM (orthogonal frequency division multiplexing), and the like) corresponding to the IEEE802.11 standard. The reverse diffusion unit 143 performs a reverse diffusion for the frequency of the received data. The demodulation unit 144 is a circuit having a demodulation system corresponding to the IEEE802.11 standard to perform the reverse modulation (the demodulation) for the phase of the received data.

The second wireless section 15 performs the short distance wireless communication with the second wireless communication apparatus by the NFC.

Figure 4:
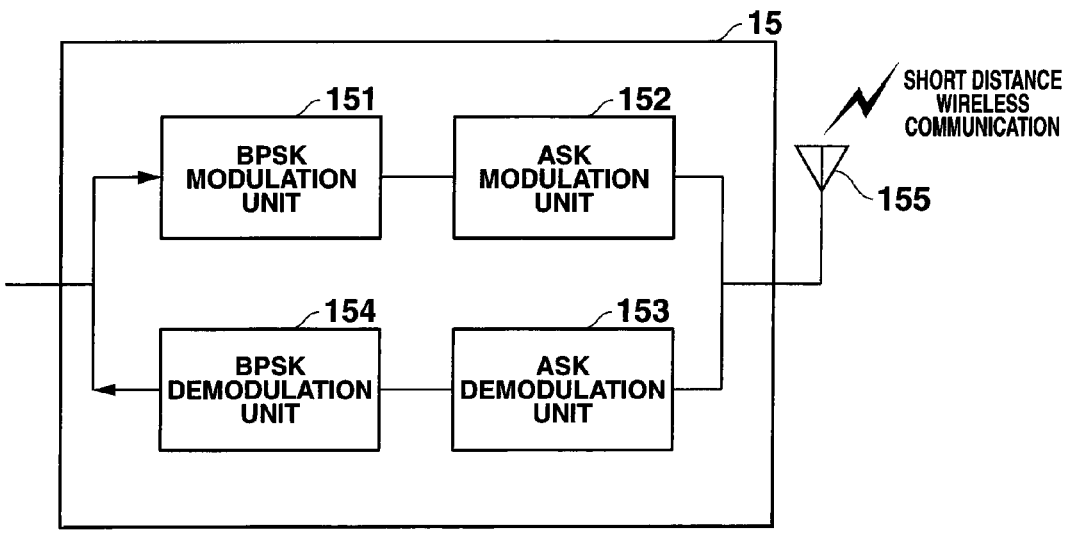
FIG. 4 is a diagram illustrating an internal configuration of a second wireless section.

FIG. 4 shows an internal configuration of the second wireless section 15.

The second wireless section 15 shown in FIG. 4 comprises a BPSK (binary phase shift keying) modulation unit 151, an ASK (amplitude shift keying) modulation unit 152, an ASK demodulation unit 153, a BPSK demodulation unit 154 and an antenna 155.

The BPSK modulation unit 151 modulates the phase of the data to be transmitted. The ASK modulation unit 152 modulates the amplitude of the data to be transmitted. The ASK demodulation unit 153 demodulates the amplitude of the received data. The BPSK demodulation unit 154 demodulates the phase of the received data.

Incidentally, the modulation system is not limited to the one described above, and others may also be applicable.

Figure 5:
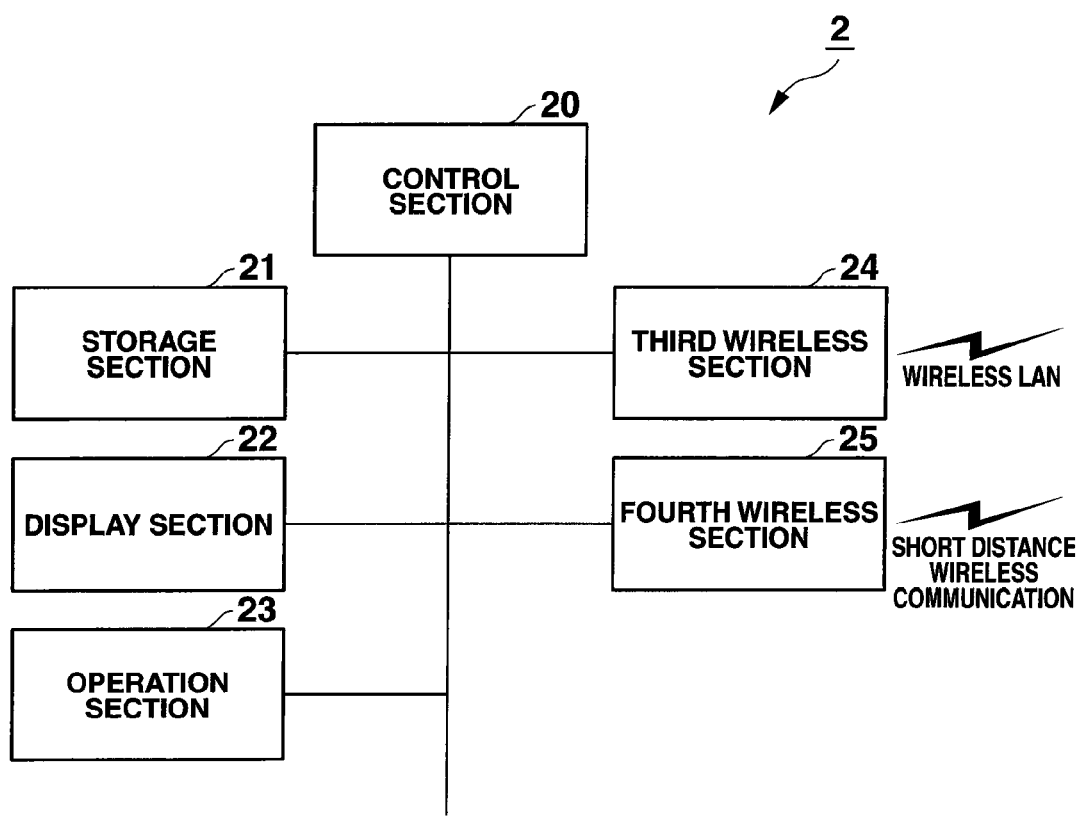
FIG. 5 is a schematic configuration diagram of a second wireless communication apparatus.

FIG. 5 shows a schematic configuration diagram of the second wireless communication apparatus 2.

As shown in FIG. 5, the second wireless communication apparatus 2 comprises a control section 20, a storage section 21, a display section 22, an operation section 23, a third wireless section 24, a fourth wireless section 25, and the like, and each section is connected to each other electrically. The second wireless communication apparatus 2 has substantially the same configuration as the first wireless communication apparatus 1, and thus only what is different therefrom will be explained.

Incidentally, in order to distinguish the first wireless communication apparatus 1 from the second wireless communication apparatus 2, each section in the second wireless communication apparatus 2 is allotted with a different reference number from that in the first wireless communication apparatus 1, for the sake of convenience. The third wireless section 24 shares the same configuration as the first wireless section 14 in the first wireless communication apparatus 1, and the fourth wireless section 25 shares the same configuration as the second wireless section 15 in the first wireless communication apparatus 1, respectively, thus the explanation for those will be omitted.

The CPU (the computer) in the control section 20 reads out a handover processing program stored in the storage section 21, various necessary data, and the like from recording medium such as the ROM or the storage section 11, to perform handover processing. The handover processing is processing in which the second wireless communication apparatus 2 performs the short distance wireless communication with the first wireless communication apparatus 1 through NFC by the fourth wireless section 25, and then hands over the communication with the first wireless communication apparatus 1 to a wireless communication through the wireless LAN by the third wireless section 24.

When this handover processing is being performed, in a case where the participation information is received by the fourth wireless section 25 through the NFC, the control section 20 according to the present embodiment instructs the third wireless section 24 to be connected to the network in which the first wireless communication apparatus 1 participates, based on the obtained participation information. Then, the control section 20 instructs the second wireless communication apparatus 2 to participate in the network in which the first wireless communication apparatus 1 and the terminal apparatus 3 exist, so as to perform the wireless communication with the first wireless communication apparatus 1 through the network.

Next, the operations in the present embodiment will be explained with reference to FIGS. 6 and 7.

Figure 6:
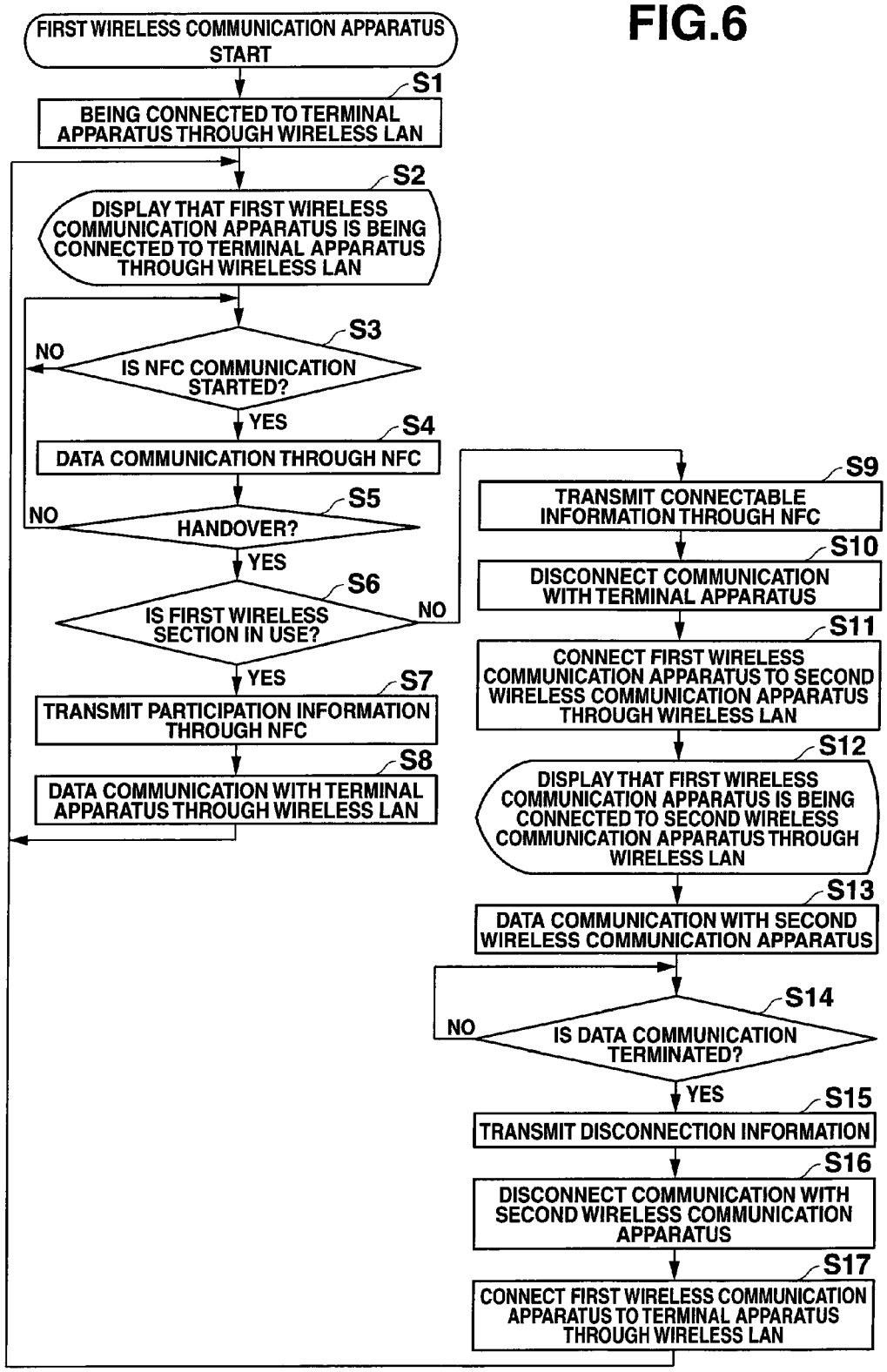
FIG. 6 is a flow chart of handover processing which is executed in the first wireless communication apparatus 1.
Figure 7:
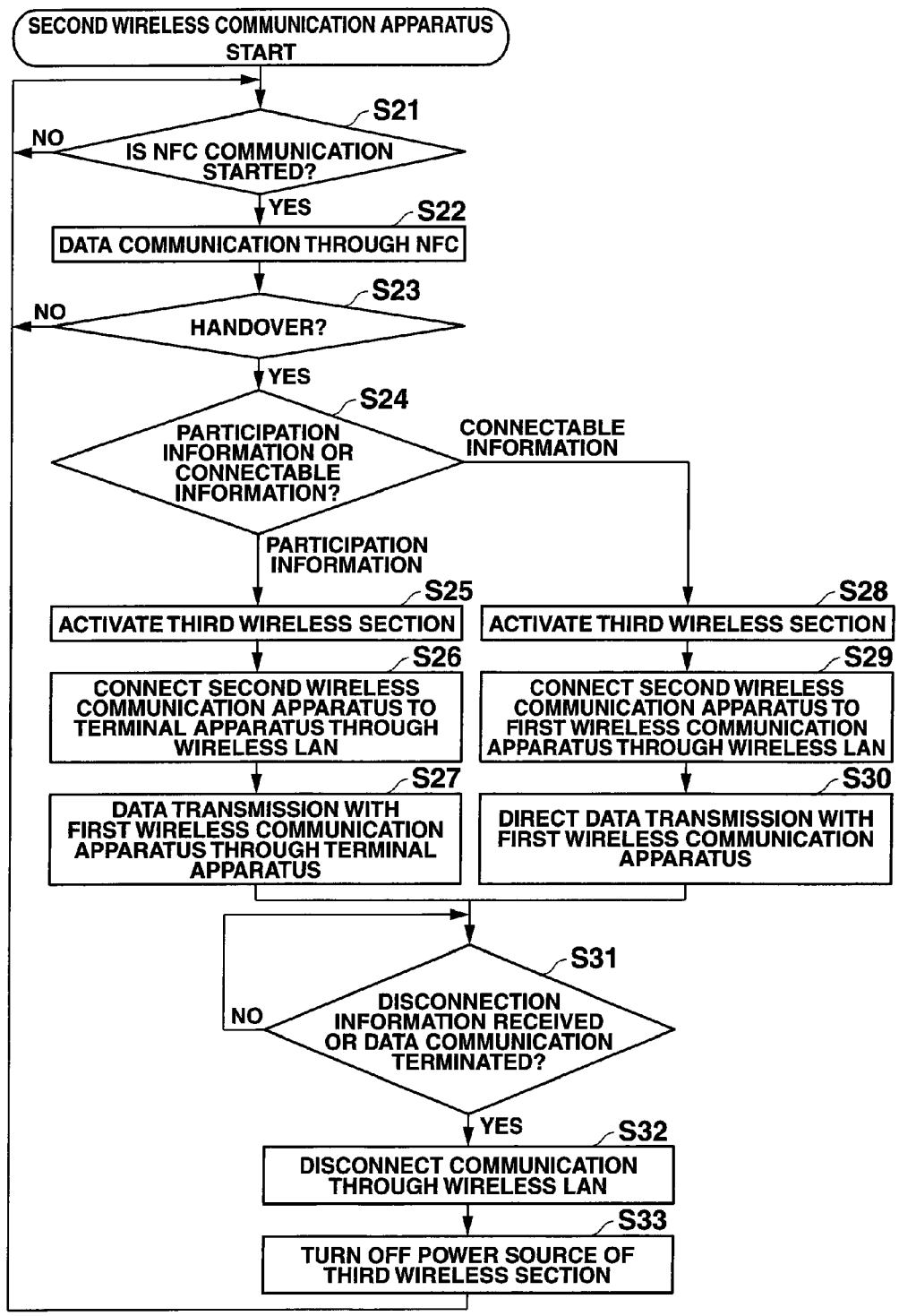
FIG. 7 is a flow chart of handover processing which is executed in the second wireless communication apparatus 2.

The first wireless communication apparatus 1 is connected to the terminal apparatus 3 through the wireless LAN by the first wireless section 14 so as to participate in the network in which the terminal apparatus 3 exists, as an initial state of the handover processing shown in FIGS. 6 and 7.

FIG. 6 shows a flow chart of the handover processing which is executed in the first wireless communication apparatus 1. Incidentally, the processing shown in FIG. 6 is executed by the control section 10 and each section in the first wireless communication apparatus 1 in cooperation.

Each processing shown in each step in this flow chart is respectively described by a program which is stored in the recoding medium of the above described storage section 11. The CPU (computer) of the control section reads out the programs from the recording medium and executes the instruction described by the read out program, so that each processing shown in each step in the flow chart is executed.

The first wireless communication apparatus 1 is being connected to the terminal apparatus 3 through the wireless LAN by the first wireless section 14 (step S1), thus the control section 10 instructs the display section 12 to display that the first wireless communication apparatus 1 is being connected to the terminal apparatus 3 through the wireless LAN (step S2).

The control section 10 determines whether to start the communication using the NFC or not (step S3). In step S3, it is determined whether or not the second wireless communication apparatus 2 approaches the first wireless communication apparatus 1, and polling data transmitted from the fourth wireless section 25 of the second wireless communication apparatus 2 is received by the second wireless section 15 of the first wireless communication apparatus 1.

When the communication using the NFC is not started (step S3; NO), the control section 10 returns to the processing in step S3. When the communication using the NFC is started (step S3; YES), the control section 10 establishes the short distance wireless communication by the second wireless section 15 through the NFC so that the data communication with the second wireless communication apparatus 2 is performed (step S4).

For example, when the second wireless section 15 receives the polling data (step S3; YES), response data corresponding to the received polling data is transmitted to the second wireless communication apparatus 2 by the second wireless section 15. Then, mutual authentication, and the like, of the first wireless communication apparatus 1 and the second wireless communication apparatus 2 are performed to establish the communication by the short distance wireless communication through the NFC, thereby the data communication is executed (step S4).

As a result of an analysis of the data communication in step S4, the control section 10 determines whether or not to hand over the wireless communication with the second wireless communication apparatus to the wireless communication by the first wireless section 14 (step S5). When the handover is not performed (step S5; NO), the control section 10 returns to the processing in step S3.

When the handover is performed (step S5; YES), the control section 10 determines whether or not the first wireless section 14 is in use (in a BUSY state) (step S6).

For example, in step S6, the control section 10 determines whether or not the first wireless section 14 is performing the data communication with the terminal apparatus 3 through the wireless LAN, and when the data communication is being performed, the control section 10 determines that the first wireless section 14 is in use (in a BUSY state).

When the first wireless section 14 is being in use (step S6; YES), the control section 10 instructs the second wireless section 15 to transmit the participation information to the second wireless communication apparatus 2 by the NFC (step S7).

In a case where the terminal apparatus 3 is the wireless access point, the participation information is information for being connected to the wireless access point. For example, the participation information may be communication standard information, an ESS-ID, a MAC address, security information, or the like of the wireless access point. After step S7, the control section 10 instructs the first wireless section 14 to perform the data communication with the terminal apparatus 3 by the wireless LAN (step S8), and returns to the processing in step S2.

When the first wireless section 14 is not yet in use (step S6; NO), the control section 10 instructs the second wireless section 15 to transmit connectable information to the second wireless communication apparatus 2 through the NFC (step S9).

The connectable information may be communication standard information, channel information, an IP address, and the like, to perform the wireless communication with the first wireless section 14 through the wireless LAN.

After step S9, the control section 10 instructs the storage section 11 to store the participation information of the network in which the first wireless section 14 participates, and further instructs the first wireless section 14 to disconnect the wireless communication with the terminal apparatus 3 (step S10).

Further, the control section 10 instructs the first wireless section 14 to be connected to the second wireless communication apparatus 2 through the wireless LAN (step S11), instructs the display section 12 to display that the first wireless communication apparatus 1 is connected to the second wireless communication apparatus 2 through the wireless LAN (step S12), and instructs the first wireless section 14 to perform the data communication with the second wireless communication apparatus 2 through the wireless LAN (step S13).

The control section 10 determines whether or not the data communication with the second wireless communication apparatus 2 is completed (step S14), and when the data communication is not completed (step S14; NO), the control section 10 returns to the processing in step S14.

When the data communication is completed (step S14; YES), the control section 10 instructs the first wireless section 14 to transmit disconnection information to the second wireless communication apparatus 2 through the wireless LAN (step S15).

The disconnection information is information to indicate that the first wireless section 14 finishes the data communication through the wireless LAN, and that the wireless communication with an apparatus to which the first wireless communication apparatus 1 is connected through the wireless LAN (which is the second wireless communication apparatus 2 in this case) is disconnected.

After step S15, the control section 10 disconnects the communication with the second wireless communication apparatus 2 by the first wireless section 14 through the wireless LAN (step S16). Then, the control section 10 reads out the participation information stored in the storage section 11 in step S10, instructs the first wireless section 14 to be connected to the terminal apparatus 3 through the wireless LAN based on the read out participation information (step S17), so as to return to the state before the handover (which is the state of participating in the network in which the terminal apparatus 3 exists), and returns to the processing in step S2.

FIG. 7 shows a flow chart of the handover processing which is executed in the second wireless communication apparatus 2. Incidentally, the processing shown in FIG. 7 is executed by the control section 20 and each section in the second wireless communication apparatus 2 in cooperation.

The control section 20 determines whether to start the communication using the NFC or not (step S21). In step S21, it is determined whether or not the second wireless communication apparatus 2 approaches the first wireless communication apparatus 1, and response data corresponding to the polling data transmitted from the fourth wireless section 25 of the second wireless communication apparatus 2 is received by the fourth wireless section 25.

When the communication using the NFC is not started (step S21; NO), the control section 20 returns to the processing in step S21. When the communication using the NFC is started (step S21; YES), the control section 20 establishes the short distance wireless communication by the fourth wireless section 25 through the NFC so that the data communication with the first wireless communication apparatus 1 is performed (step S22).

As a result of an analysis of the data communication in step S22, the control section 20 determines whether or not to hand over the wireless communication with the first wireless communication apparatus to the wireless communication by the third wireless section 24 (step S23). When the handover is not performed (step S23; NO), the control section 20 returns to the processing in step S21.

When the handover is performed (step S23; YES), the control section 20 determines whether the information received by the fourth wireless section 25 is the participation information or the connectable information (step S24).

When the participation information is received by the fourth wireless section 25 (step S24; participation information), the control section 20 turns on the power source to activate the third wireless section 24 (step S25), and instructs the third wireless section 24 to be connected to the terminal apparatus 3 through the wireless LAN based on the received and obtained participation information (step S26). By step S26, the second wireless communication apparatus 2 is to participate in the network in which the terminal apparatus 3 exists. Then, the control section 20 instructs the wireless section 24 to perform the data communication with the first wireless communication apparatus 1 via network in which the terminal apparatus 3 exists through the wireless LAN (step S27).

When the connectable information is received by the fourth wireless section 25 (step S24; connectable information), the control section 20 turns on the power source to activate the third wireless section 24 (step S28), and instructs the third wireless section 24 to be connected to the first wireless communication apparatus 1 through the wireless LAN based on the connectable information (step S29). Then, the control section 20 instructs the third wireless section 24 to perform the data communication directly with the first wireless communication apparatus through the wireless LAN (step S30).

After step S27 or step S30, the control section 20 determines whether the disconnection information is received or the data communication is terminated (step S31). When the disconnection information is not received and the data communication is not terminated (step S31; NO), the control section 20 returns to the processing in step S31.

When the disconnection information is received, or the data communication is terminated (step S31; YES), the control section 20 instructs the third wireless section 24 to disconnect the communication through the wireless LAN (step S32), stops the third wireless section 24 and turns off the third wireless section 24 (step S33), then returns to the processing in step S21.

As described above, according to the present embodiment, when the communication is handed over from the short distance wireless communication (NFC) to the wireless LAN communication, the access point of the third wireless section to perform the wireless LAN of the second wireless communication apparatus which is the initiator side may be switched, according to the usage status of the first wireless section to perform the wireless LAN of the first wireless communication apparatus which is to be the target side. Accordingly, the second wireless communication apparatus can also participate in the network in which the first wireless communication apparatus participates. Thus, the first wireless communication apparatus which is the target side can perform communication with the second wireless communication apparatus which is the initiator side without disconnecting the communication in the participating network, thereby the operation performance of the wireless communication apparatus to perform the handover may be improved.

In the present embodiment, the terminal apparatus 3 is set as the wireless access point, and the network in which the terminal apparatus 3 exists is the one having an infrastructure mode.

When the handover is performed, in a case where the first wireless communication apparatus 1 is connected to the wireless access point (the terminal apparatus 3) to participate in the network, the second wireless communication apparatus can participate in the network in which the wireless access point (the terminal apparatus 3) exists, by the participation information which indicates the information for being connected to the wireless access point (the terminal apparatus 3). Accordingly, the first wireless communication apparatus and the second wireless communication apparatus may perform the wireless communication through the network in which the wireless access point (the terminal apparatus 3) exists.

In a case where the network in which the terminal apparatus 3 exists has an ad-hoc mode, and the first wireless communication apparatus 1 participates in this network, the second wireless communication apparatus 2 is to participate in the network so that the first wireless communication apparatus and the second wireless communication apparatus perform the data communication directly.

In the case where the network is of the ad-hoc mode, the participation information which the first wireless communication apparatus 1 transmits in step S7 is information to perform the wireless communication with the first wireless communication apparatus 1 through the network. For example, the participation information may be the communication system of the network, encrypted information, a channel, an IP address of the first wireless communication apparatus, and the like.

Further, when the network is of the ad-hoc mode, the control section 20 of the second wireless communication apparatus 2 instructs the third wireless section 24 to participate in the network which comprises the terminal apparatus 3 and the first wireless communication apparatus through the wireless LAN based on the participation information, in steps S26 and S27, so that the third wireless section 24 may perform the data communication directly with the first wireless communication apparatus in the network through the wireless LAN.

As discussed above, in the case where the first wireless communication apparatus and the terminal apparatus configure the network having the ad-hoc mode, the participation information is the information to perform the wireless communication with the first wireless communication apparatus in the network, thereby the first wireless communication apparatus and the second wireless communication apparatus can perform the wireless communication directly.

Incidentally, the present embodiment is explained as a case in which when the handover is performed, the target side is the first wireless communication apparatus 1, and the initiator side is the second wireless communication apparatus 2. However, the first wireless communication apparatus and the second wireless communication apparatus may comprise a function to perform the handover processing shown in FIGS. 6 and 7, and it is preferable that the processing shown in FIG. 6 or 7 may be performed according to whether the apparatus is of the target side or the initiator side when the handover is carried out.

Further, the first wireless section 14 of the first wireless communication apparatus 1 and the third wireless section 24 of the second wireless communication apparatus 2 are explained to perform the wireless communication through the wireless LAN by IEEE802.11b. However the wireless communication may be altered to another having a different communication distance and a communication method from those of the short distance wireless communication which may be represented by the NFC such as the Bluetooth (registered trademark).

Hereinbelow, another embodiment is explained with reference to FIGS. 8 and 9.

Incidentally, the apparatus configurations are the same as the above described wireless communication system comprising the first wireless communication apparatus, the second wireless communication apparatus and the terminal apparatus, thus the illustration and the explanation thereof will be omitted.

Figure 8:
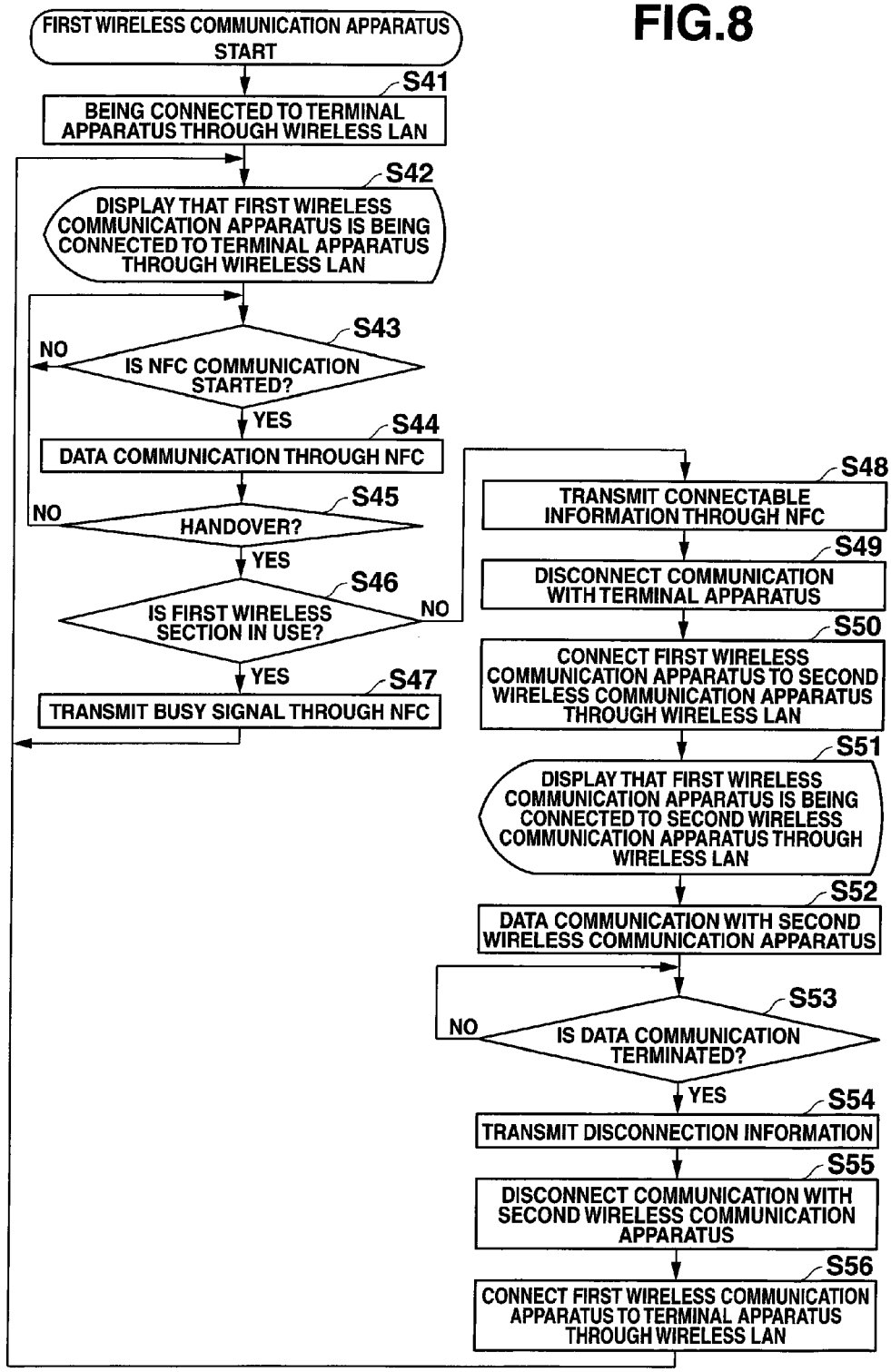
FIG. 8 is a flow chart of handover processing which is executed in the first wireless communication apparatus 1 according to another embodiment.
Figure 9:
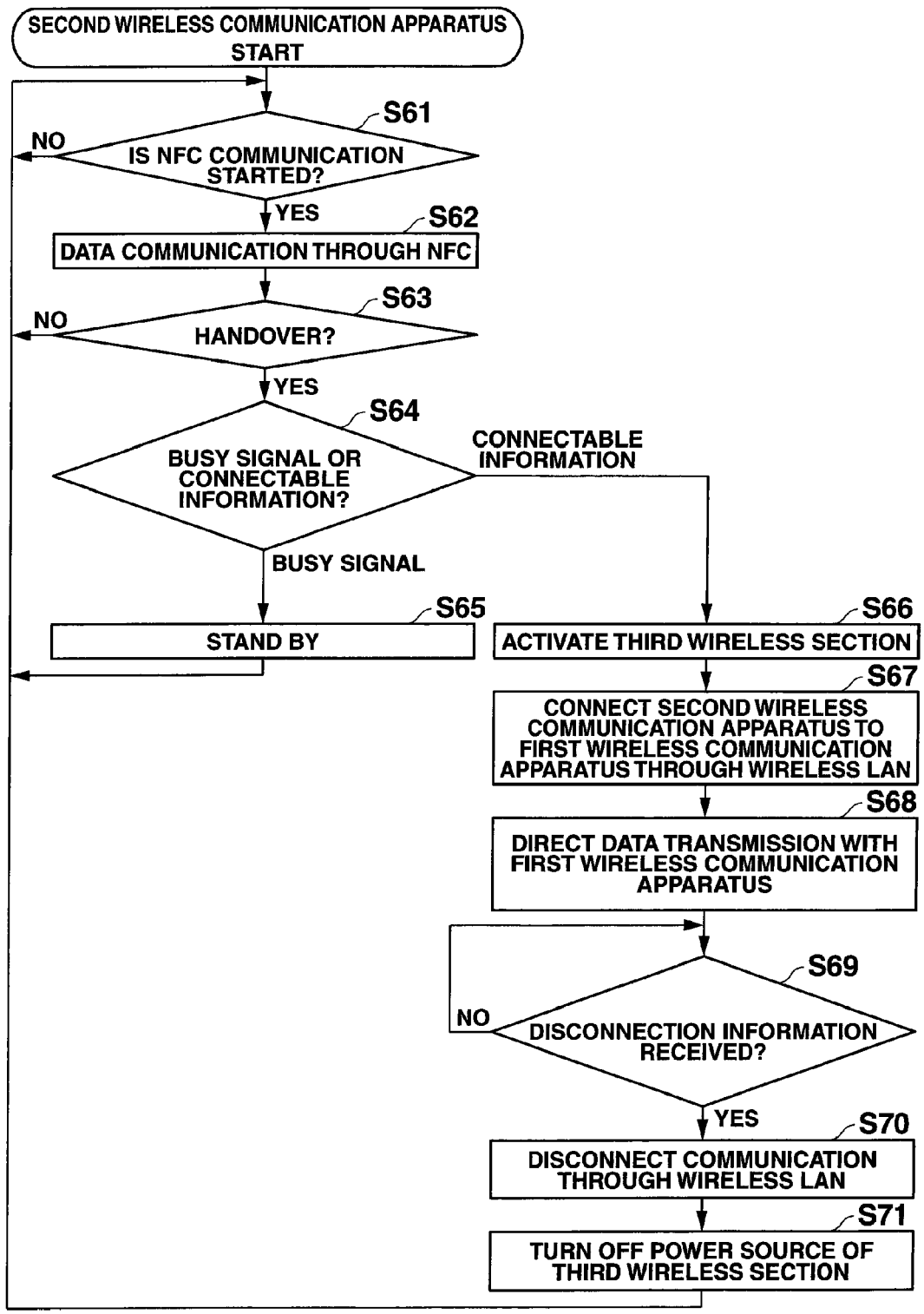
FIG. 9 is a flow chart of handover processing which is executed in the second wireless communication apparatus 2 according to another embodiment.

In the handover processing shown in FIGS. 8 and 9, when the first wireless section 14 of the first wireless communication apparatus which is of the initiator side is in use, the handover is to be temporarily suspended. Further, the first wireless communication apparatus 1 is connected to the terminal apparatus 3 through the wireless LAN by the first wireless section 14 so as to participate in the network in which the terminal apparatus 3 exists, as an initial state of the handover processing shown in FIGS. 8 and 9.

FIG. 8 shows a flow chart of handover processing which is executed in the first wireless communication apparatus 1. Incidentally, the processing shown in FIG. 8 is executed by the control section 10 and each section in the first wireless communication apparatus 1 in cooperation.

Steps S41-S46 shown in FIG. 8 are performed in the same manner as steps S1-S6 shown in FIG. 6, thus the explanation thereof will be omitted.

When the first wireless section 14 is in use (step S46; YES), the control section 10 instructs the second wireless section 15 to transmit a BUSY signal to the second wireless communication apparatus 2 through the NFC (step S47), and returns to the processing in step S42. The BUSY signal is a signal to notify the second wireless communication apparatus 2 that the first wireless section 14 is in a state incapable of receiving data.

Steps S48-S56 are performed in the same manner as steps S9-S17 shown in FIG. 6, thus the explanation thereof will be omitted.

That is to say, in the processing shown in FIG. 8, when the first wireless section 14 is in use, the first wireless communication apparatus 1 transmits the BUSY signal to the second wireless communication apparatus 2 to inform the second wireless communication apparatus 2 that the data communication through the wireless LAN cannot be performed. Further, when the first wireless section 14 is not in use, the data communication with the second wireless communication apparatus 2 is to be performed.

FIG. 9 shows a flow chart of the handover processing which is executed in the second wireless communication apparatus 2. Incidentally, the processing shown in FIG. 9 is executed by the control section 20 and each section in the second wireless communication apparatus 2 in cooperation.

Steps S61-S63 shown in FIG. 9 are performed in the same manner as steps S21-S23 shown in FIG. 7, thus the explanation thereof will be omitted.

When the handover is performed (step S63; YES), the control section 20 determines whether the information received by the fourth wireless section 25 is the BUSY signal or the connectable information (step S64).

When the BUSY signal is received by the fourth wireless section 25 (step S64; BUSY signal), the control section 20 stands by for a previously set time (step S65), and returns to the processing is step S61, to attempt the handover by the NFC again.

Steps S66-S68 are performed in the same manner as steps S28-S30 shown in FIG. 7, thus the explanation thereof will be omitted.

After step S30, the control section 20 determines whether or not the disconnection information is received (step S69). When the disconnection information is not received (step S69; NO), the control section 20 returns to the processing in step S69.

When the disconnection information is received (step S69; YES), the control section 20 instructs the third wireless section 24 to disconnect the communication through the wireless LAN (step S70), stops the third wireless section 24 and turns off the third wireless section 24 (step S71), then returns to the processing in step S61.

That is to say, in the processing shown in FIG. 9, when the BUSY signal is received, the second wireless communication apparatus 2 attempts the handover through NFC every previously set amount of time, and suspends the data communication through the wireless LAN until the BUSY signal is not received (until the connectable information is received). Further, the second wireless communication apparatus 2 performs the data communication with the first wireless communication apparatus 1 when the connectable information is received.

As described above, according to another embodiment as shown in FIGS. 8 and 9, in a case where the communication is handed over from the short distance wireless communication (NFC) to the wireless LAN communication, the handover can be executed according to the usage status of the first wireless section to perform the wireless LAN of the first wireless communication apparatus which is to be the target side.

Accordingly, when the first wireless section of the first wireless communication apparatus is being connected to a network (which is in a BUSY state), the second wireless communication apparatus stands by, and the handover is executed when the first wireless section is no longer in the BUSY state. Thus, the network will not be suddenly disconnected while the first wireless section of the first wireless communication apparatus which is the target side is being connected to the network. Thereby, the operation performance of the wireless communication apparatus to perform the handover may be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which is capable of performing wireless LAN communication through a wireless LAN communication section with a terminal apparatus and with a second wireless communication apparatus and which is capable of performing short distance wireless communication through a short distance wireless communication section with the second wireless communication apparatus, the wireless communication apparatus comprising:
    a first judgment section which, when the wireless communication apparatus is in a state of performing data communication through the short distance wireless communication section with the second wireless communication apparatus based on at least polling data and authentication information received from the second wireless communication apparatus, judges whether the data communication is to be taken over by data communication through the wireless LAN communication section;
    a second judgment section which, when the first judgment section judges that the data communication is to be taken over by data communication through the wireless LAN communication section, judges whether the wireless LAN communication section is in a data communication state with the terminal apparatus when the wireless LAN communication section is in a state of being communicationally connected to the terminal apparatus via a wireless LAN and of not being communicationally connected to the second wireless communication apparatus through the terminal apparatus via the wireless LAN;
    a first communication control section which starts wireless LAN communication with the second wireless communication apparatus through the terminal apparatus while maintaining the state of being communicationally connected to the terminal apparatus via the wireless LAN, when the wireless LAN communication section is judged to be in the data communication state with the terminal apparatus by the second judgment section; and
    a second communication control section which disconnects a wireless LAN connection with the terminal apparatus through the wireless LAN communication section, communicationally connects the wireless LAN communication section to the second wireless communication apparatus, and performs wireless LAN communication with the second wireless communication apparatus without the terminal apparatus, when the wireless LAN communication section is judged to be not in the data communication state with the terminal apparatus by the second judgment section.

2. The wireless communication apparatus according to claim 1, wherein the second communication control section disconnects a wireless LAN connection with the second wireless communication apparatus and reconnects the wireless LAN connection of the wireless LAN communication section with the terminal apparatus, when wireless LAN communication by the wireless LAN section with the second wireless communication apparatus is terminated.

3. The wireless communication apparatus according to claim 1, wherein when the first communication control section starts wireless LAN communication with the second wireless communication apparatus, the first communication control section notifies the second wireless communication apparatus of participation information indicating an address where the terminal apparatus exists in the network, and starts the wireless LAN communication with the second wireless communication apparatus.

4. A wireless communication apparatus which is capable of performing wireless LAN communication through a wireless LAN communication section with a terminal apparatus and with a second wireless communication apparatus and which is capable of performing short distance wireless communication through a short distance wireless communication section with the second wireless communication apparatus, the wireless communication apparatus comprising:
    a first judgment section which, when the wireless communication apparatus is in a state of performing data communication through the short distance wireless communication section with the second wireless communication apparatus based on at least polling data and authentication information received from the second wireless communication apparatus, judges whether the data communication is to be taken over by data communication through the wireless LAN communication section;
    a second judgment section which, when the first judgment section judges that the data communication is to be taken over by data communication through the wireless LAN communication section, judges whether the wireless communication apparatus is in a data communication state with the terminal apparatus through the wireless LAN communication section, before starting wireless LAN communication with the second wireless communication apparatus through the wireless LAN communication section;
    a first communication control section which starts wireless LAN communication with the second wireless communication apparatus through the terminal apparatus while maintaining a state of being communicationally connected to the terminal apparatus via the wireless LAN, when the wireless communication apparatus is judged to be in the data communication state with the terminal apparatus through the wireless LAN communication section by the second judgment section; and
    a second communication control section which (i) disconnects a wireless LAN connection with the terminal apparatus through the wireless LAN communication section and starts wireless LAN communication by directly performing a wireless LAN connection with the second wireless communication apparatus through the wireless LAN communication section when the wireless communication apparatus is judged to be not in the data communication state with the terminal apparatus through the wireless LAN communication section by the second judgment section, and (ii) disconnects the wireless LAN connection with the second wireless communication apparatus and reconnects the wireless LAN connection of the wireless LAN communication section with the terminal apparatus when wireless LAN communication with the second wireless communication apparatus is terminated.

5. A non-transitory computer-readable recording medium storing a program to control a computer of a wireless communication apparatus which is capable of performing wireless communication through a wireless LAN communication section with a terminal apparatus and with a second wireless communication apparatus and which is capable of performing short distance wireless communication through a short distance wireless communication section with the second wireless communication apparatus, the program enabling the computer to function as elements comprising:

a first judgment section which, when the wireless communication apparatus is in a state of performing data communication through the short distance wireless communication section with the second wireless communication apparatus based on at least polling data and authentication information received from the second wireless communication apparatus, judges whether the data communication is to be taken over by data communication through the wireless LAN communication section;

a second judgment section which, when the first judgment section judges that the data communication is to be taken over by data communication through the wireless LAN communication section, judges whether the wireless LAN communication section is in a data communication state with the terminal apparatus when the wireless LAN communication section is in a state of being communicationally connected to the terminal apparatus via a wireless LAN and of not being not communicationally connected to the second wireless communication apparatus through the terminal apparatus via the wireless LAN;

a first communication control section which starts wireless LAN communication with the second wireless communication apparatus through the terminal apparatus while maintaining the state of being communicationally connected to the terminal apparatus via the wireless LAN, when the wireless LAN communication section is judged to be in the data communication state with the terminal apparatus by the second judgment section; and a second communication control section which disconnects a wireless LAN connection with the terminal apparatus through the wireless LAN communication section, communicationally connects the wireless LAN communication section to the second wireless communication apparatus, and performs wireless LAN communication with the second wireless communication apparatus without the terminal apparatus, when the wireless LAN communication section is judged to be not in the data communication state with the terminal apparatus by the second judgment section.

6. A non-transitory computer-readable recording medium storing a program to control a computer of a wireless communication apparatus which is capable of performing wireless LAN communication through a wireless LAN communication section with a terminal apparatus and with a second wireless communication apparatus and which is capable of performing short distance wireless communication through a short distance wireless communication section with the second wireless communication apparatus, the program enabling the computer to function as elements comprising:

a first judgment section which, when the wireless communication apparatus is in a state of performing data communication through the short distance wireless communication section with the second wireless communication apparatus based on at least polling data and authentication information received from the second wireless communication apparatus, judges whether the data communication is to be taken over by data communication through the wireless LAN communication section;

a second judgment section which, when the first judgment section judges that the data communication is to be taken over by data communication through the wireless LAN communication section, judges whether the wireless communication apparatus is in a data communication state with the terminal apparatus through the wireless LAN communication section, before starting wireless LAN communication with the second wireless communication apparatus through the wireless LAN communication section;

a first communication control section which starts wireless LAN communication with the second wireless communication apparatus through the terminal apparatus while maintaining a state of being communicationally connected to the terminal apparatus via the wireless LAN, when the wireless communication apparatus is judged to be in the data communication state with the terminal apparatus through the wireless LAN communication section by the second judgment section; and a second communication control section which (i) disconnects a wireless LAN connection with the terminal apparatus through the wireless LAN communication section and starts wireless LAN communication by directly performing a wireless LAN connection with the second wireless communication apparatus through the wireless LAN communication section when the wireless communication apparatus is judged to be not in the data communication state with the terminal apparatus through the wireless LAN communication section by the second judgment section, and (ii) disconnects the wireless LAN connection with the second wireless communication apparatus and reconnects the wireless LAN connection of the wireless LAN communication section with the terminal apparatus when the wireless LAN communication with the second wireless communication apparatus is terminated.

* * * * *